United States Patent
Conway

(10) Patent No.: US 10,114,955 B2
(45) Date of Patent: Oct. 30, 2018

(54) INCREASING SEARCH ABILITY OF PRIVATE, ENCRYPTED DATA

(71) Applicant: Visa International Service Association, San Francisco, CA (US)

(72) Inventor: Adam Conway, Snoqualmie, WA (US)

(73) Assignee: Visa International Service Association, San Francisco, CA (US)

( * ) Notice: Subject to any disclaimer, the term of this patent is extended or adjusted under 35 U.S.C. 154(b) by 130 days.

(21) Appl. No.: 15/041,783

(22) Filed: Feb. 11, 2016

(65) Prior Publication Data

US 2016/0232362 A1  Aug. 11, 2016

Related U.S. Application Data

(60) Provisional application No. 62/114,976, filed on Feb. 11, 2015.

(51) Int. Cl.
*G06F 17/30* (2006.01)
*G06F 21/60* (2013.01)

(52) U.S. Cl.
CPC ...... *G06F 21/602* (2013.01); *G06F 17/30533* (2013.01); *G06F 17/30542* (2013.01); *G06F 17/30477* (2013.01)

(58) Field of Classification Search
CPC ............. G06F 21/602; G06F 17/30533; G06F 17/30477
See application file for complete search history.

(56) References Cited

U.S. PATENT DOCUMENTS

| 5,787,428 | A | * | 7/1998 | Hart | G06F 21/6227 |
| 6,119,120 | A | * | 9/2000 | Miller | G06F 7/02 |
| 6,938,022 | B1 | * | 8/2005 | Singhal | G06F 21/6254 705/74 |
| 7,743,069 | B2 | | 6/2010 | Chitkara et al. | |
| 8,380,750 | B2 | * | 2/2013 | Gorelik | G06F 17/30554 707/791 |
| 8,639,948 | B2 | | 1/2014 | Browning | |
| 8,930,691 | B2 | * | 1/2015 | Kamara | G06F 21/6218 713/165 |

(Continued)

FOREIGN PATENT DOCUMENTS

| WO | 2009036810 | 3/2009 |
| WO | 2013174457 | 11/2013 |

OTHER PUBLICATIONS

PCT/US2016/017551, "International Search Report and Written Opinion", dated Jun. 8, 2016, 11 pages.

(Continued)

*Primary Examiner* — Sharon S Lynch
(74) *Attorney, Agent, or Firm* — Kilpatrick Townsend & Stockton LLP

(57) ABSTRACT

Techniques are provided to allow full search for encrypted data within a database. In some embodiments, searchable data may be separated into different searchable tables in a database in such a way that encrypted data is stored as plaintext but has no usable link to other data within the source database. In some embodiments, performing a query on a particular user data may result in the retrieval of an encrypted identifier, which may then be decrypted via an encryption module. A second search based on the decrypted identifier may produce a set of relevant search results from a source table.

16 Claims, 7 Drawing Sheets

(56) References Cited

U.S. PATENT DOCUMENTS

| | | | |
|---|---|---|---|
| 9,047,480 B2 * | 6/2015 | Kahol | G06F 21/10 |
| 9,152,579 B2 * | 10/2015 | Mattsson | G06F 21/6209 |
| 9,544,134 B2 * | 1/2017 | Aissi | G06F 21/64 |
| 9,760,697 B1 * | 9/2017 | Walker | G06Q 21/31 |
| 2007/0130070 A1 * | 6/2007 | Williams | G06Q 30/02 |
| | | | 705/50 |
| 2008/0147554 A1 * | 6/2008 | Stevens | G06F 19/322 |
| | | | 705/51 |
| 2009/0113213 A1 | 4/2009 | Park et al. | |
| 2009/0138706 A1 | 5/2009 | Rajasekaran et al. | |
| 2010/0211800 A1 * | 8/2010 | La Rocca | G06F 21/6227 |
| | | | 713/189 |
| 2010/0306221 A1 * | 12/2010 | Lokam | G06F 17/30631 |
| | | | 707/759 |
| 2012/0226916 A1 * | 9/2012 | Hahn | G06Q 50/22 |
| | | | 713/193 |
| 2013/0067226 A1 * | 3/2013 | Kunde | H04L 9/0894 |
| | | | 713/168 |
| 2013/0091357 A1 * | 4/2013 | Moon | G06F 21/6227 |
| | | | 713/168 |
| 2013/0238646 A1 | 9/2013 | Maro et al. | |
| 2014/0052999 A1 * | 2/2014 | Aissi | G06F 21/64 |
| | | | 713/189 |
| 2014/0281589 A1 * | 9/2014 | Bain | G06F 21/6218 |
| | | | 713/193 |
| 2015/0039885 A1 * | 2/2015 | Cash | G06F 21/6227 |
| | | | 713/165 |
| 2015/0039886 A1 * | 2/2015 | Kahol | G06F 21/10 |
| | | | 713/165 |
| 2015/0039903 A1 * | 2/2015 | Cash | G06F 21/602 |
| | | | 713/189 |
| 2015/0095642 A1 * | 4/2015 | Spalka | G06F 21/6218 |
| | | | 713/161 |
| 2015/0154418 A1 * | 6/2015 | Redberg | G06F 17/30106 |
| | | | 713/165 |
| 2015/0356314 A1 * | 12/2015 | Kumar | G06F 17/30336 |
| | | | 713/165 |
| 2016/0034714 A1 * | 2/2016 | Cuthbertson | G06F 21/6254 |
| | | | 713/189 |
| 2016/0342811 A1 * | 11/2016 | Whitcomb | G06F 21/6245 |
| 2017/0053134 A1 * | 2/2017 | Kumar | G06F 17/30336 |
| 2017/0230370 A1 * | 8/2017 | Himmelstein | H04L 63/10 |

OTHER PUBLICATIONS

EP16749884.9 , "Extended European Search Report", dated Jun. 8, 2018, 9 pages.

* cited by examiner

INCREASING SEARCH ABILITY OF PRIVATE, ENCRYPTED DATA

CROSS-REFERENCES TO RELATED APPLICATIONS

This application is a non-provisional of and claims the benefit of U.S. Provisional Application No. 62/114,976, filed Feb. 11, 2015, which is herein incorporated by reference in its entirety for all purposes.

FIELD

Generally, the present application relates to data processing. Specifically, the application is related to protecting encrypted data while allowing searching of the data, e.g., using wildcards.

BACKGROUND

Storing encrypted data or other private data is often a potential security risk for any entity. The personally identifiable information often has value to fraudsters, making a data store with personally identifiable information a target for hacking attempts. Such private data can be encrypted in a database so as to protect access from a hacker. However, encrypted data within a database may not easily be searched. In many implementations, data is stored in a database using a hash function and any query against the data is required to be an exact match of the hash value. This typically requires a user to enter an exact value of the string to be searched. This exact value may be hashed using the has function and an exact match found. This may conflict with business needs that require that personally identifiable information be searchable using wild cards or other partial data searches.

Encryption of encrypted data, for example, address line, phone number, and fax number is important for protecting the privacy of those identified. A problem is that once encrypted, these fields are hard to access via search. Many applications that use encrypted data can be written such that they need full text searches on these fields. For example, a customer service representative (CSR) application relies on being able to search for customer data when assisting a customer. As an example, a CSR may enter a phone number (e.g., 123-456-7890) into a search field and submit a search query. If the data being searched is not encrypted, then the application need only make a direct comparison to identify the relevant database records.

However, if the data being searched is stored in encrypted format, it may not be searchable. A typical solution for this scenario is to use a hashing function. For example, one solution may be to use a one-way cryptographic hash function. A general hash function is a function that maps digital data of an arbitrary size to other digital data of a fixed size. A cryptographic hash function allows for verification that input data matches a stored hash value, while making it difficult to construct any data that would hash to the same value or find any two unique data pieces that hash to the same value.

A system could perform a hashing operation on the plaintext encrypted data and store those hashes. When a user submits a search query for a particular piece of encrypted data, for example the phone number 123-456-7890, the same hashing operation is performed on the phone number, which is compared to the stored hashed values to determine if the hash matches any records. This solution is often feasible when exact search terms are used (e.g., where a user types in the full, exact data that they are searching for).

Unfortunately, in a more typical scenario, a user may not enter the entire data that they are searching for, in this case 123-456-7890, and instead may enter 123-456*, or similar, where * represents a wildcard character. The user in this scenario would be submitting a wildcard search which is intended to result in a set of relevant results. However, in a system that requires an exact match to equal a hash value, this use of wildcards would not be permissible.

Embodiments of the invention address these and other problems, individually and collectively.

BRIEF SUMMARY

To address the above concerns, embodiments of the disclosure may utilize one or more separate searchable tables that include plaintext (e.g., fully searchable text). Each piece of the clear data may correspond to source data that is stored separately in encrypted form (e.g., in a separate row or separate table). As an example, various fields of a source record can be stored as plaintext in separate locations such that the plaintext fields cannot easily be correlated to obtain all of the private information in the source record. In this manner, a hacker who has obtained a portion of the data is not able to link that obtained data to an individual record in the source data. For example, a phone number record may be stored separately in plaintext from the plaintext address record and/or the plaintext name record, making the data unusable for an unauthorized party that has maliciously obtained it.

In some embodiments, data may be separated into different searchable tables (or equivalently into separate rows of one table) in such a way that the encrypted data is stored as plaintext, but has no usable link to other data within the database. In some embodiments, a unique encrypted foreign key may be stored with each piece of plaintext data. The foreign key may be used to refer back to a source table in order to identify one or more records relevant to the search string. For example, a search for user data (e.g., using wildcards) can retrieve an encrypted identifier, which may then be input into a decryption module (engine) to obtain a foreign key for accessing a source table where the data is encrypted, and where a complete data record for a person may be stored together, e.g., as fields in a row. The foreign key can then be used to search the source table based on the decrypted identifiers to return the desired encrypted data, which may be sent to the decryption module to provide the desired data.

Other embodiments are directed to systems, devices, and computer readable media associated with methods described herein.

A better understanding of the nature and advantages of embodiments of the present invention may be gained with reference to the following detailed description and the accompanying drawings.

BRIEF DESCRIPTION OF THE DRAWINGS

Various embodiments in accordance with the present disclosure will be described with reference to the drawings, in which.

TERMS

Figure 1:
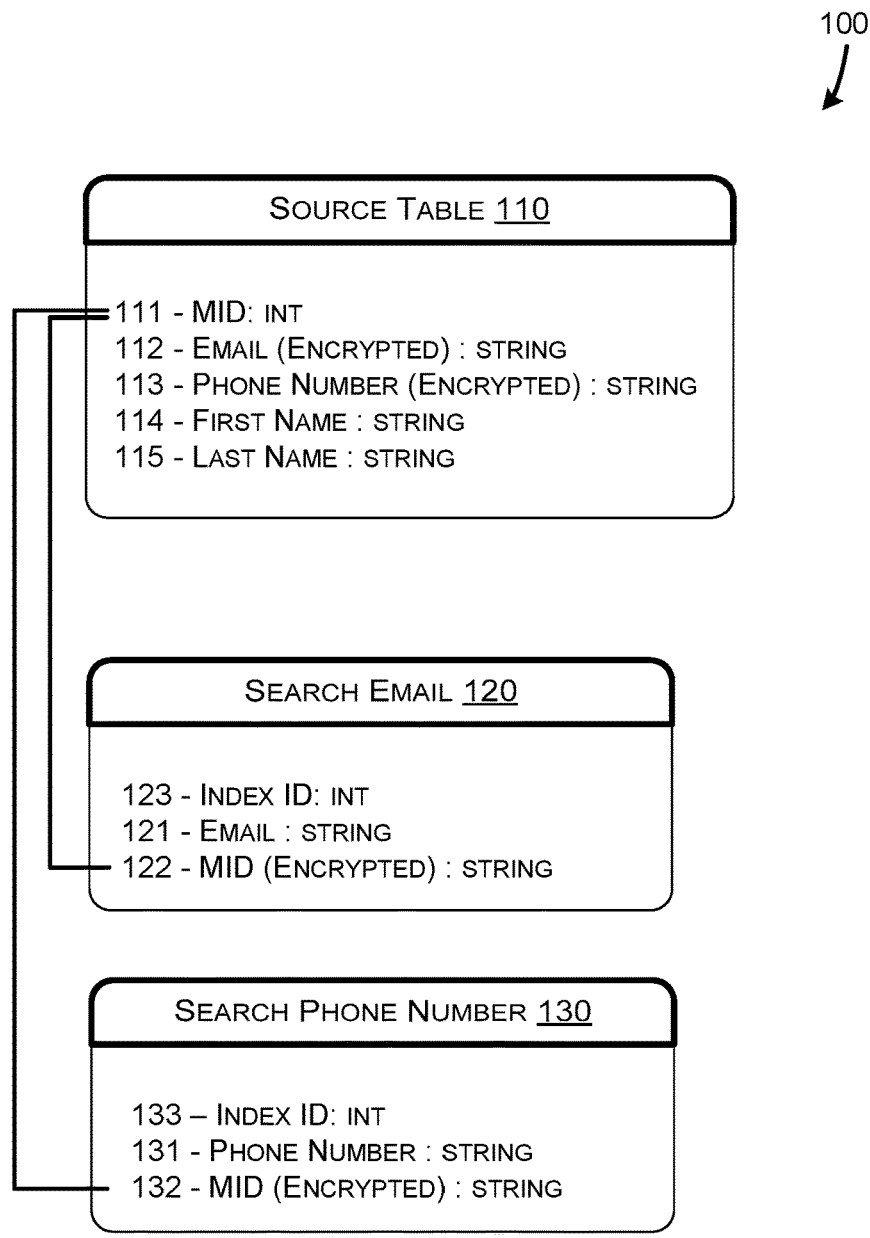
FIG. 1 depicts a sample database table scheme in accordance with at least some embodiments provided herein.

Prior to discussing specific embodiments of the invention, some terms may be described in detail.

A "client computer" may include any suitable computational apparatus. The client computer may be operated by a consumer, a user associated with a business entity, or any other individual. The client computer may use any suitable wired or wireless network, including the Internet, in order to communicate with other systems. For example, a consumer client computer may be used by a consumer to interact with a merchant Internet storefront in order to conduct a transaction. A merchant client computer may be used by a user associated with a merchant to interact with other merchant computer systems and a described platform. Examples of computers and consumer mobile devices include any device capable of accessing the Internet, such as a personal computer, cellular or wireless phones, personal digital assistants (PDAs), tablet PCs, and handheld specialized readers.

A "database" may include any hardware, software, firmware, or combination of the preceding for storing and facilitating retrieval of information. Also, the database may use any of a variety of data structures, arrangements, and compilations to store and facilitate retrieval of information.

A "database record," also called a row or tuple, may refer to a single, implicitly structured data item within a database. Each database record in the source table may be associated with a particular person or entity. Each database record in a search table may include an encrypted foreign key, a primary key, and a plaintext search field.

"Personally identifiable information" may refer to any information that can be used to distinguish or trace an individual's identity, either alone or when combined with other personal or identifying information that is linked or linkable to a specific individual. For example, personally identifiable information may comprise an address, a phone number, a date of birth, a social security number, date and place of birth, mother's maiden name, biometric records, or any other suitable individual-specific information. Various legal requirements exist for the storage and use of personally identifiable information. Personally identifiable information may also include information that is linked or linkable to an individual, such as medical, educational, financial, and employment information.

A "processor" may include hardware within a mobile device (or other electronic device) that carries out instructions embodied as code in a computer-readable medium (e.g., a non-transitory computer-readable medium). An exemplary processor may be a central processing unit (CPU). As used herein, a processor can include a single-core processor, a plurality of single-core processors, a multi-core processor, a plurality of multi-core processors, or any other suitable combination of hardware configured to perform arithmetical, logical, and/or input/output operations of a computing device.

A "server computer" may include any suitable computer that can provide communications to other computers and receive communications from other computers. A server computer may include a computer or cluster of computers. For instance, a server computer can be a mainframe, a minicomputer cluster, or a group of servers functioning as a unit. In one example, a server computer may be a database server coupled to a Web server. A server computer may be coupled to a database and may include any hardware, software, other logic, or combination of the preceding for servicing the requests from one or more client computers. A server computer may comprise one or more computational apparatuses and may use any of a variety of computing structures, arrangements, and compilations for servicing the requests from one or more client computers. Data transfer and other communications between components such as computers may occur via any suitable wired or wireless network, such as the Internet or private networks.

A "service computer" or "service provider computer" may include any system associated with an entity that provides a resource or service. In some embodiments, the service provider computer may handle functionality of a computer application associated with the entity that provides the resource or service. The service provider may provide any suitable service. For example, the service provider may be a merchant, a utility company, a payment processing network, a wallet provider, a merchant, a website operator, or a bank. For the purposes of this disclosure, a service provider computer refers to the provider of the disclosed platform.

An "update" may include additions, deletions, conversions, or any other alterations to a preexisting database record. Updates may also refer to the creation of new database records or entries. For example, the update may be to add or delete data to a field within a database record, and/or the update may be to add or delete an entire database record within the database table. Updates may also refer to changes to text fields within a database record.

A "user" may refer to an individual or entity who can access the described platform using credentials (e.g. merchant ID, user ID and password) that the individual or entity is authorized to use. As used herein, a user may also refer to an individual or entity that is not authorized to access the described platform, but has access to authorized credentials allowing them access to the described platform. The user may submit search queries via a user interface or console commands.

DETAILED DESCRIPTION

In accordance with at least some embodiments, the disclosure is directed to a database platform capable of providing efficient search ability of personally identifiable information (or other encrypted data). When storing encrypted data in a database while at rest is a potential security risk, a solution to this risk is to encrypt the data. However, encrypted data cannot be searched easily. A typical approach is to apply hashing of the encrypted data, which only allows search for entries that have an exact match to a hashed value. However, businesses may require that this encrypted data be fully searchable, e.g., using wild cards. Embodiments may separate the data into multiple tables in such a way that the encrypted data is stored in the clear but has no usable link to other data within database.

Described herein is a platform that can manage encrypted and other sensitive data so that it is fully searchable. For example, embodiments can generate multiple searchable tables that include a plaintext version of a column of encrypted data in the source table. The plaintext values in the searchable tables are associated with an encrypted foreign key, that, when decrypted, enables a user to query data from the source table. In this way, each piece of plaintext data is stored with no useable link to any other data related to a record. In this way, encrypted data may be made searchable without the need to use an exact match of the string to be searched.

A searchable encrypted database scheme is described that may be implemented in accordance with some embodiments of the disclosure. Additionally, an example database system will be described that is capable of implementing the searchable encrypted database scheme in accordance with at least some embodiments. The disclosure will also cover searching, as well as updating, the described database system.

I. Searchable Database with Encrypted Data

A database table is typically constructed of one or more columns and one or more rows. The columns of a database table typically represent fields that may be searched upon. The rows of a database table typically represent individual records. Each individual record may have a value populated in each of the columns across the row. To perform a query on the database, one would typically specify a column (e.g., a field to be searched, such as phone number) and provide a search string, which often includes a wildcard. The rows having values that match that search string within the column are returned as a result set. However, in order to protect sensitive data, some columns of a database table may be encrypted, meaning that they will contain undecipherable data. To search these columns, one would typically need to provide the exact string of characters to be searched, i.e. no wildcards. This string would then be encrypted and compared to values in the column.

In order to provide a database system having encrypted data that is fully searchable without providing an exact string of characters to be searched, the disclosure discusses a database table scheme that may be implemented in at least some embodiments. In this database table scheme, a source table may include multiple columns of data, some of which may contain encrypted data and some of which may contain plaintext data. One or more searchable tables (separate from the source table) may be generated for each encrypted column of the source table. The generated searchable table may comprise a plaintext column that represents decrypted data from the corresponding encrypted column of the source table. This database table scheme is described in more detail with respect to FIG. 1 below.

FIG. 1 depicts a sample database table scheme 100 in accordance with at least some embodiments provided herein. The database may contain one or more source tables which contains a decrypted unique identifier (ID), one or more items of encrypted data, and possibly additional plaintext or encrypted data fields. In FIG. 1, Source Table 110 is depicted as including a unique ID master identifier (MID) field 111, an encrypted email address field 112, an encrypted phone number field 113, and a first name field 114 and a last name field 115 stored in plaintext. The underlying data in encrypted email address field 112 and the encrypted phone number field 113 may be considered private information (e.g., encrypted data). In some embodiments, other fields, such as the first name field 114 and/or last name field 115 may also be encrypted.

FIG. 1 also depicts two searchable tables 120 and 130 that each contain an encrypted ID (122 and 132), a piece of plaintext encrypted data (121 and 131), and a table index ID (also known as a primary key, 123 and 133). Search Email table 120 is depicted as containing a column of plaintext email addresses 121, with each of the plaintext email addresses being in a separate row of the Search Email table 120. For example, the Search Email table 120 may include a plaintext version of each encrypted value from the email address column of the source table 110. Each email address can be stored as a separate row in Search Email table 120, where each row has a corresponding primary key and a corresponding encrypted unique ID. This would allow the system to search for an email address, in whole or part, in order to retrieve associated encrypted identifiers 122 (also referred to as MID).

Similarly, the Search Phone Number table 130 contains plaintext phone numbers 131 that allow the system to search for a phone number, in whole or part, in order to retrieve associated encrypted identifiers 132. The database table scheme may have separate searchable tables for each type of encrypted data stored in the database (e.g., a separate searchable table for each column of encrypted data of the source table 110).

As depicted, each of the MIDs 122 and 132 in the searchable tables may be correlated to the MID 111 in the source table. However, the MIDs of the searchable tables may be encrypted such that the MID is not easily linkable to the corresponding source data. In some embodiments, the MID 122 and/or the MID 132 may be an encrypted version of the MID 111. Using a decryption engine, the system can obtain a decrypted version of a retrieved MID, and then search Source Table 110 using the decrypted version of the MID to obtain encrypted information data, for example, fields 112 and 113. The encrypted information data can then also be decrypted.

In at least some embodiments, database system 100 provides a separation of personally identifiable information, where one type of encrypted data is stored in searchable tables such that the personally identifiable information is not directly associated with other encrypted data. For example, the phone number 123-456-7890 can be stored in plaintext in a phone number column of the table Search Phone Number 130, and the phone number plaintext data may be the only column of plaintext encrypted data included in that searchable table. Similarly, other pieces of encrypted data may also be stored as a single plaintext column in a separate searchable table (e.g., without any other columns of encrypted data), making it worthless to a fraudster, as the fraudster cannot connect one piece of data of a person to other pieces of data.

A searchable table, for example the Search Email table 120, contains a column of plaintext encrypted data, in this case the Email field. In the example shown, next to that email address, the only other column of plaintext information in the searchable table may be a column including an encrypted identifier. The identifier may be non-readable in the sense that it is encrypted (e.g., an encrypted foreign key). In the depicted example, the encrypted identifier may be the MID 122. A search on in this table for a particular email address or part of an email address can return a list of zero or more encrypted MIDs. The resulting list of MIDs may be subjected to a decryption engine to identify a list of decrypted MIDs.

In some embodiments, the decrypted list of MIDs may be used in a second query against the source table 110 in order to retrieve additional related encrypted data. Thus, once the encrypted foreign key is retrieved, it can be sent through a decryption engine in order to obtain the foreign key in plaintext form. Once the foreign key is obtained, it may subsequently be used to perform a query on an additional table, like Source Table 110, that contains encrypted data related to the search string that was queried. In some embodiments, the foreign key may correspond to the MID 111 (e.g., a record ID) that may be used to identify a record in the source table. However, the plaintext that matches to the query, or part thereof, is needed in order to first retrieve the encrypted foreign key before any data from the source table 110 may be retrieved. A query may return the corresponding first name and last name, and additional pieces of encrypted data corresponding to the email address originally searched for. This additional encrypted data may be in encrypted, or ciphertext, format.

Accordingly, embodiments of the disclosure may allow a system to perform full text searches on data that is encrypted. Each one of these types of encrypted data may be stored in plaintext within its own table, for example the Search Email and Search Phone Number tables of FIG. 1. Other example tables include, but are not limited to mailing or business addresses, social security numbers, date and place of birth, mother's maiden name, biometric records, medical, educational, financial, and employment information, and so on. Each of these searchable tables contains a column of encrypted foreign key IDs and a column of plaintext data of a particular type, where the encrypted foreign key ID for a given piece of plaintext data can be used to identify the record in the source table that includes the plaintext data. Since there is no link to other sensitive data, storing plaintext encrypted data in this way may be used so as to not compromise additional encrypted data stored in plaintext in the database.

II. Database System

In order to provide the searchable database scheme presented above, the disclosure discusses an example database system (service provider computer) capable of implementing at least some embodiments of such a scheme. The service provider computer described may include one or more databases and logic for providing encryption and decryption. This database system is described in greater detail with respect to FIG. 2 below.

Figure 2:
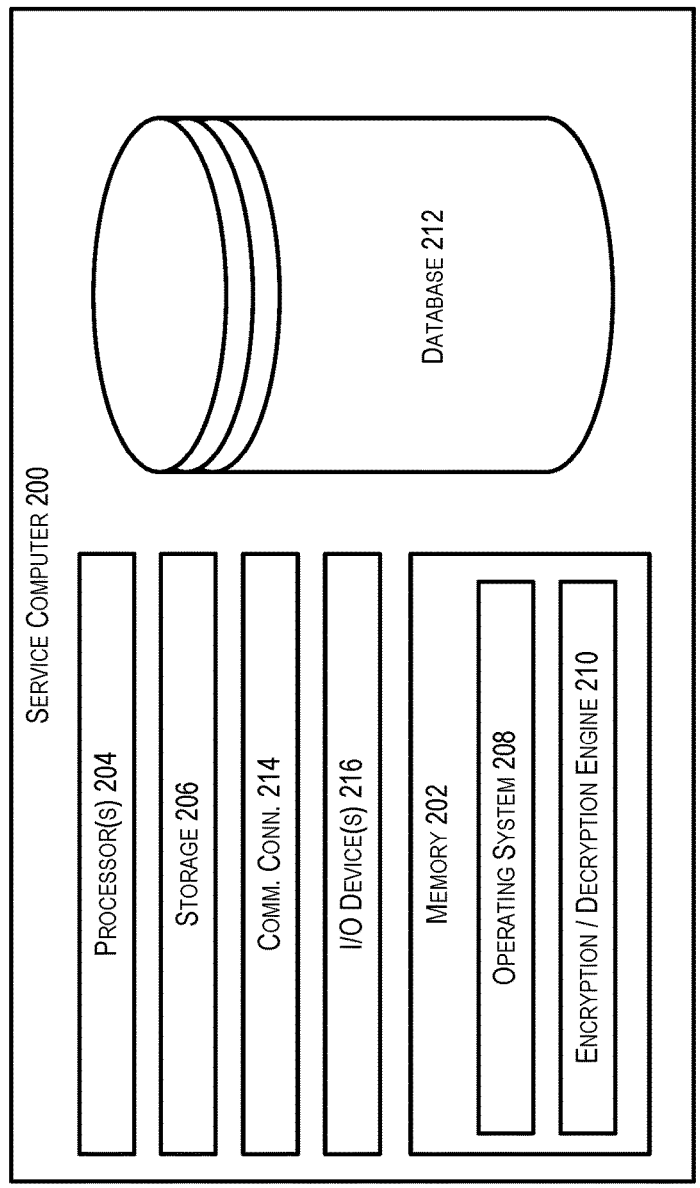
FIG. 2 depicts an illustrative example of a service provider computer capable of providing backend support for database platform in accordance with at least some embodiments.

FIG. 2 depicts an illustrative example of a service provider computer capable of providing backend support for a database platform in accordance with at least some embodiments.

The service provider computer may be any type of computing device including a remotely located server computer. Additionally, it should be noted that in some embodiments, the service computer 200 may be embodied by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment.

In one illustrative configuration, the service computer 200 may include at least one memory 202 and one or more processing units (or processor(s)) 204. The processor(s) 204 may be implemented as appropriate in hardware, computer-executable instructions, firmware or combinations thereof. Computer-executable instruction or firmware embodiments of the processor(s) 204 may include computer-executable or machine executable instructions written in any suitable programming language to perform the various functions described.

The memory 202 may store program instructions that are loadable and executable on the processor(s) 204, as well as data generated during the execution of these programs. Depending on the configuration and type of service computer 200, the memory 202 may be volatile (such as random access memory (RAM)) and/or non-volatile (such as read-only memory (ROM), flash memory, etc.). The service computer 200 may also include additional storage 206, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some embodiments, the memory 202 may include multiple different types of memory, such as static random access memory (SRAM), dynamic random access memory (DRAM) or ROM. Turning to the contents of the memory 202 in more detail, the memory 202 may include an operating system 208 and one or more application programs or services for implementing the features disclosed herein including at least a module for encrypting or decrypting identifiers (encryption/decryption engine 210). The memory 202 may also include a database 212, which stores personally identifiable information as well as other data.

The memory 202 and the additional storage 206, both removable and non-removable, are examples of computer-readable storage media. For example, computer-readable storage media may include volatile or non-volatile, removable or non-removable media implemented in any method or technology for storage of information such as computer-readable instructions, data structures, program modules or other data. As used herein, a module or an engine may refer to programming modules executed by computing systems (e.g., processors) that are stored on and executed from a user device or the service computer 200. The service computer 200 may also contain communications connection(s) 214 that allow the service computer 200 to communicate with one or more stored databases 212, another computing device or server, user terminals, and/or other devices over a network. The service computer 200 may also include input/output (I/O) device(s) and/or ports 216, such as for enabling connection with a keyboard, a mouse, a pen, a voice input device, a touch input device, a display, speakers, a printer, etc.

Turning to the contents of the memory 202 in more detail, the memory 202 may include an operating system 208. A database containing at least some encrypted data is shown and may also be incorporated into the memory 202 or a different memory. One or more application programs or services for implementing the features disclosed herein, including an encryption/decryption engine 210, may also be stored in the memory 202. Encryption/decryption engine 210 may include separate sub-engines for encryption and decryption, which may share a common communication interface and/or common libraries. The database 212 may comprise any suitable persistent data storage system. In some embodiments, the database 212 may be stored in a database. Information stored in the database 212 may be accessed by the encryption/decryption engine 210 via a database query or any other suitable data retrieval means.

In some embodiments, the encryption/decryption engine 210 may, in conjunction with the processor 204, be configured to encrypt and/or decrypt data provided to it. For example, the encryption/decryption engine 210 may be configured to decrypt an encrypted foreign key that is provided to it, as well encrypted data from a source table. In some embodiments, the encryption/decryption engine 210 may execute when it receives a request command (e.g., a call to an encryption or decryption function) that provides data to be encrypted or decrypted. In some embodiments, the data to be decrypted may be passed to the encryption/decryption engine 210 as a parameter of a function call. The encryption/decryption engine 210 may be provided with an encryption and/or decryption key as a parameter of a function call.

In some embodiments, the encryption/decryption engine 210 may perform a database lookup to identify a key. In some embodiments, the encryption/decryption engine 210 may utilize a hard-coded encryption/decryption key and/or encryption algorithm. The encryption/decryption engine 210 may utilize any suitable encryption or decryption algorithm for encoding data within database 212. In some embodiments, the encryption/decryption engine 210 may comprise a hardware security module (HSM), capable of that safeguarding and managing digital keys for strong authentication and cryptoprocessing. A hardware security module may be a physical computing device configured to safeguard and manage digital keys for strong authentication. The hardware security module may also be configured to provide cryptoprocessing.

In some embodiments, the database 212 may comprise information to be associated with various individuals. The database 212 may include a source table and one or more searchable tables, each associated with a piece of personally identifiable information. In some embodiments, the database 212 may comprise at least some ciphertext data and at least some plaintext data. In some embodiments, both a ciphertext version and a plaintext version of the same data may be stored in database 212. For example, a master identifier of the searchable table may be a ciphertext version of a plaintext master identifier of a source table. In some embodiments, all of the data in one or more columns of a table may be encrypted. In some embodiments, data encrypted in one table may utilize a different encryption/decryption key than data encrypted in a second table.

III. Searching a Database Having Encrypted Data

In order to utilize the above described scheme, a database system may initiate a database query. In some embodiments, a user may provide an indication of a field or column to be searched and a search string (e.g., a string of alphanumeric characters for which matching data should be found). The database system may be configured to identify an appropriate searchable table (e.g., based on the indicated field or column), identify foreign keys associated with matching data within the searchable table, and query a source table for information related to the identified foreign keys. In the disclosure, a method of searching a database having encrypted data, a data flow associated with a database search, and an example process of performing a search on a database that includes encrypted data are described below.

A. Method

Figure 3:
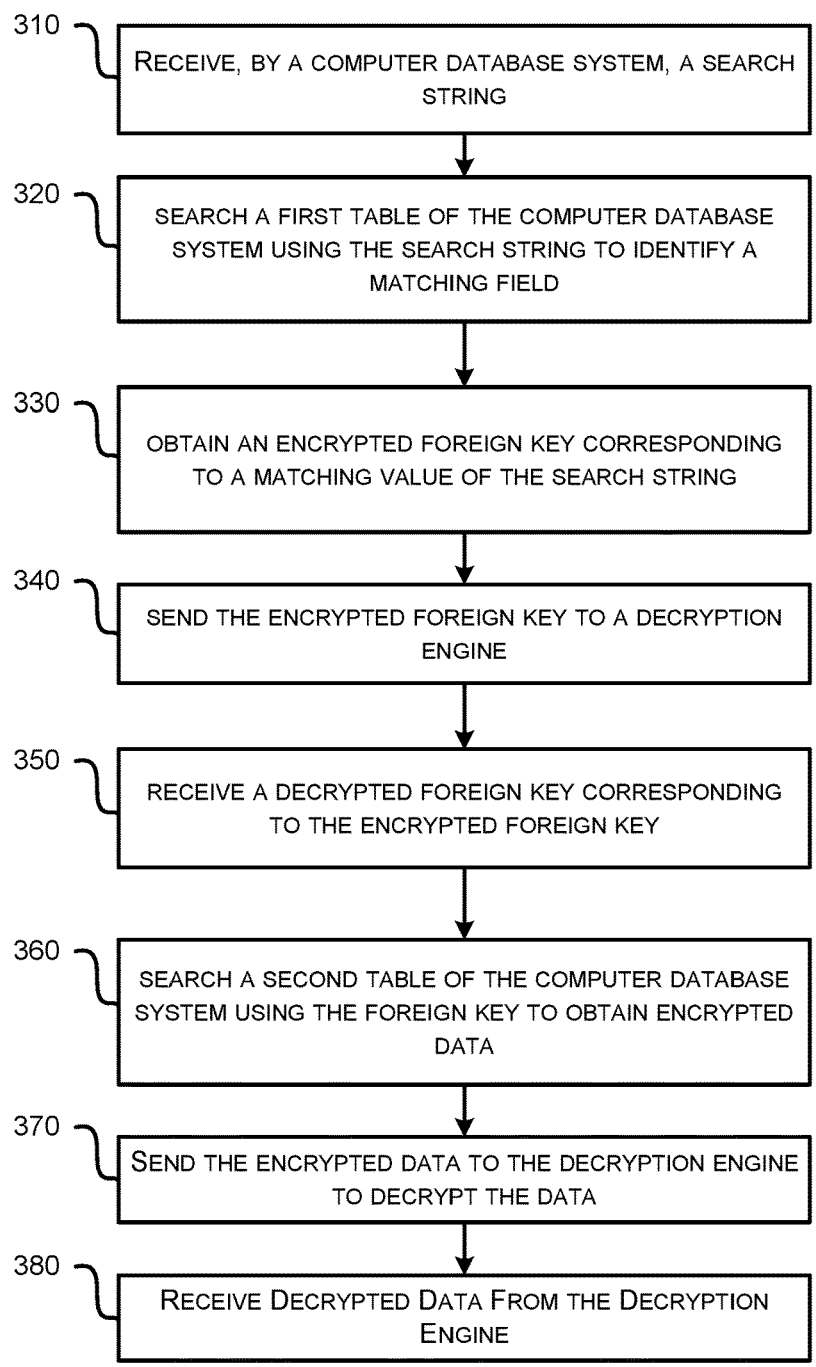
FIG. 3 depicts a flowchart of a method 300 for searching a database to obtain data according to at least some embodiments of the present invention.

FIG. 3 depicts a flowchart of a method 300 for searching a database to obtain data according to at least some embodiments of the present invention. Method 300 can be performed by a search system, which may be performed by a computer database system and a search machine.

At block 310, a computer database system receives a query for a requested field value. The requested field value may comprise an indication of a field or column from which a value is to be returned. For example, the query may contain the phrase "select last_name," indicating that a value in the last name field is to be returned for any records in a result set. The query may also include a search string. This search string may include wildcards to specify only a partial required string match for desired data. For example, if searching for phone number, the search string may be 123-456-*, where * is a wildcard character.

In some embodiments, the query may specify one or more fields or columns to be searched against. For example, the query may include the language "where phone_number='123-456*'," indicating that the phone number field of a source table is to be searched for the search string. In some embodiments, multiple fields and search strings may be provided. For example, the query may include the language "where phone_number='123-456*' and city='Houston'." In this example, the query may return a result set including all records that match both conditions.

At block 320, a first table of the computer database system is searched using the search string to identify one or more matching values. The first table may be identified based on the field indicated in the query. For example, the field in the query may refer to an encrypted column of a source table. The first table may be a searchable table having a plaintext column of data that corresponds to that encrypted column of a source table. The database system may compare the search string to values stored in the plaintext column to identify one or more values that match the provided search string. For example, the values 123-456-7890 and 123-456-1234 are both matches for a search string 123-456*. In this example, both records of the first table would be returned as having matching values.

At block 330, the search of the first table results in one or more encrypted foreign keys corresponding to matching values of the search string being obtained. Once the database system has identified one or more matching values from the plaintext column of the first table at block 320, the database system would identify a value from the foreign key field of the records containing those matching values. For example if the first table is Search Phone Number table 130 of FIG. 1, for any records associated with phone numbers that match the search string, the corresponding encrypted foreign keys will be returned for those records.

At block 340, an encrypted foreign key is sent to the decryption engine for decryption. The decryption engine may subject the encrypted foreign key to one or more decryption algorithms to decrypt the foreign key. In some embodiments, the one or more decryption algorithms may utilize a decryption key. In some embodiments, the decryption key utilized by the decryption engine may depend on the searchable table from which the encrypted foreign key was obtained. For example, each searchable table may be associated with a different decryption key. Decryption of the foreign key by the decryption engine may result in a plaintext version of the foreign key. The decryption engine may correspond to encryption/decryption engine 210 of FIG. 2.

At block 350, the decrypted foreign key is received back from encryption/decryption engine. At this block, the foreign key may be provided to the database system in a response message. In some embodiments, the decrypted foreign key may be returned by a function.

At block 360, a second table of the database is searched for one or more encrypted field values corresponding to the decrypted foreign key obtained in block 350. For example, the second table may be the Source Table 110 of FIG. 1, and the encrypted email and encrypted phone number corresponding to the decrypted foreign key may be retrieved from the database. Additionally, if there is plaintext data in the second table, it may be obtained as well. For example in Source Table 110, First Name and Last Name are stored in plaintext, and the search may retrieve these field values as well. In some embodiments, particular field values may be requested in the query. For example, the query may specify the fields for which values should be returned from a source table with respect to a search string.

At block 370, any encrypted field values that were retrieved in block 360 may be sent to the decryption engine to be decrypted. At this block, the decryption engine may subject the encrypted field values to one or more decryption algorithms to obtain decrypted versions of the field values. In some embodiments, each field of the source table may be associated with a separate decryption key.

At block 380, the decrypted user data is received from the decryption engine. Once decrypted it may be sent back to the requestor, possibly along with any plaintext data that was retrieved.

The system is able to separate the storage of different pieces of encrypted data, including but not limited to phone numbers, email addresses, and mailing addresses, because were they all stored together, someone with database access might be able to easily obtain all relevant encrypted data for a person. However, if each one only appears in plaintext in separate tables and in encrypted parts of the same table, then it will be more difficult to associate those encrypted data items to the same entity and to a same person without access to the decryption engine. Even if the database is stolen or accessed without permission, the data is unusable by virtue of each table being unconnected.

Once the system has the foreign key for a particular piece of encrypted data, it can use that foreign key to obtain additional related encrypted data from other database tables. It could perform additional queries to get data out of the database. The user issuing the query would never see the foreign key as there would be no need to return the foreign key to the user, but the internal system could use it to obtain additional encrypted data. A system user would never actually retrieve a foreign encrypted key, and instead the system will use the key for later steps, but the system would never need to send a foreign encrypted key back to a system user.

B. Data Flow

Figure 4:
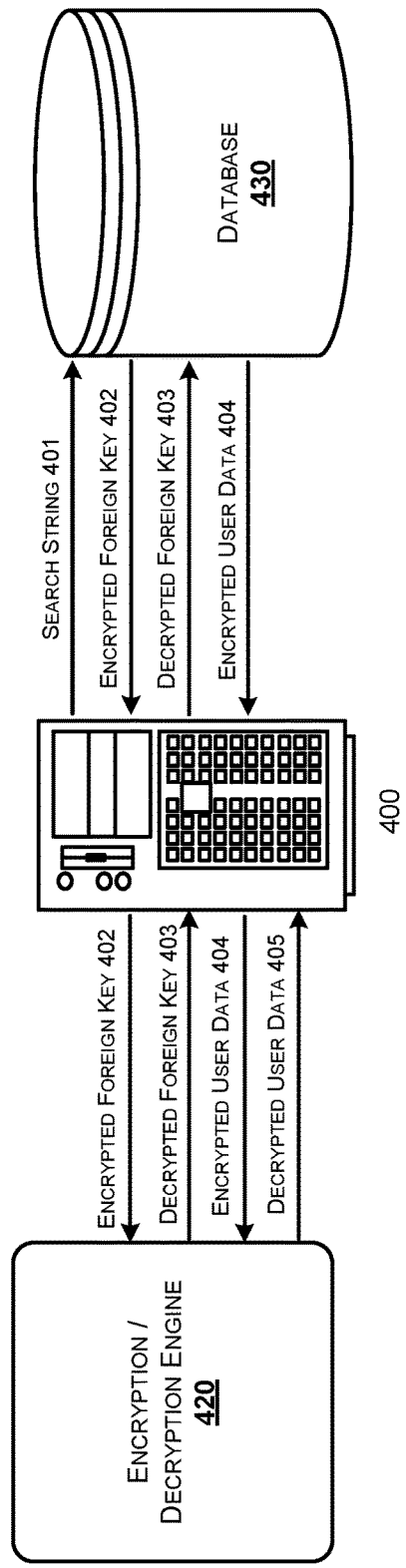
FIG. 4 depicts a system diagram showing devices and data flow according to at least some embodiments provided herein.

FIG. 4 depicts a system diagram showing devices and data flow according to at least some embodiments provided herein. A service computer 400 has software which allows a user to input the search data they desire to obtain. In some embodiments, service computer 400 may be an example service computer 200 of FIG. 2.

Upon a search string being entered into a search interface, a database 430 is queried using the search string, e.g., according to method 300 of FIG. 3. The query may include service computer 400 sending a search string 401 to database 430 to attempt to find data corresponding to search string 401. A search interface may be executed from a client device in communication with the service computer 400 via a network interface. The search interface may be a browser application (e.g., a web browser) installed on, and executed from, a remotely located client device.

In some embodiments, the search interface may be a graphical user interface (GUI) implemented on, and executed from, a client device. The GUI may be associated with an application or program in communication with the database system. For example, a user may be presented with a number of searchable fields via a GUI implemented on a remote client device. The user may enter a search string into any of the presented searchable fields. Upon detecting that the user has entered one or more search strings into one or more of the searchable fields, the GUI may transmit the entered the entered search strings to the database system with an indication of the searchable fields in which they were entered.

Database 430 sends back a result set of one or more encrypted foreign keys that corresponds to the search string at 402. An encrypted foreign key may correspond to (relate to) a search string if it is included in the foreign key field of a record or row for which a value of a plaintext field matches the search string. In other words, once a plaintext value is identified as matching the search string, the foreign key value located in the same row of the searchable table as that plaintext value is appended to a set of results to be returned. In some embodiments, multiple plaintext values within a column of plaintext values may be identified as matching the search string. In this scenario, each of the encrypted foreign keys for each of the rows containing the identified plaintext values may be appended to the result set.

Service computer 400 sends a foreign encryption key from the result set to decryption engine 420 to decrypt. The decryption engine will know how to decrypt the foreign key using the foreign encryption key, the table name, and possibly a cryptographic nonce. Once decrypted, decryption engine 420 will send decrypted foreign key 403 to service computer 400. Method 300 can use an encryption/decryption engine 420 to decrypt encrypted data obtained by and used in the search.

Service computer 400 then sends another search query including decrypted foreign key 403 to database 430. Database 430 can then search for data corresponding to decrypted foreign key 403, and return encrypted user data 404 to service computer 400.

Service computer 400 will then send encrypted user data 404 to decryption engine 420 for decryption. Once encrypted user data 404 is decrypted, decrypted user data 405 is sent to service computer 400. Service computer 400 can then provide a response to the query, e.g., via the search interface.

C. Example Process

In order to utilize the described disclosure, a database system may be configured to perform one or more processes on the described database scheme. Some or all of any processes described herein (or variations and/or combinations thereof) may be performed under the control of one or more computer systems configured with executable instructions and may be implemented as code (e.g., executable instructions, one or more computer programs or one or more applications). In accordance with at least one embodiment, one or more processes may be performed by at least the device 102 depicted in FIG. 1. The code may be stored on a computer-readable storage medium, for example, in the form of a computer program including a plurality of instructions executable by one or more processors. The computer-readable storage medium may be non-transitory. The below description highlights one example process for identifying and returning a decrypted set of source data that may be initiated by a database system upon receiving a request for information.

Figure 5:
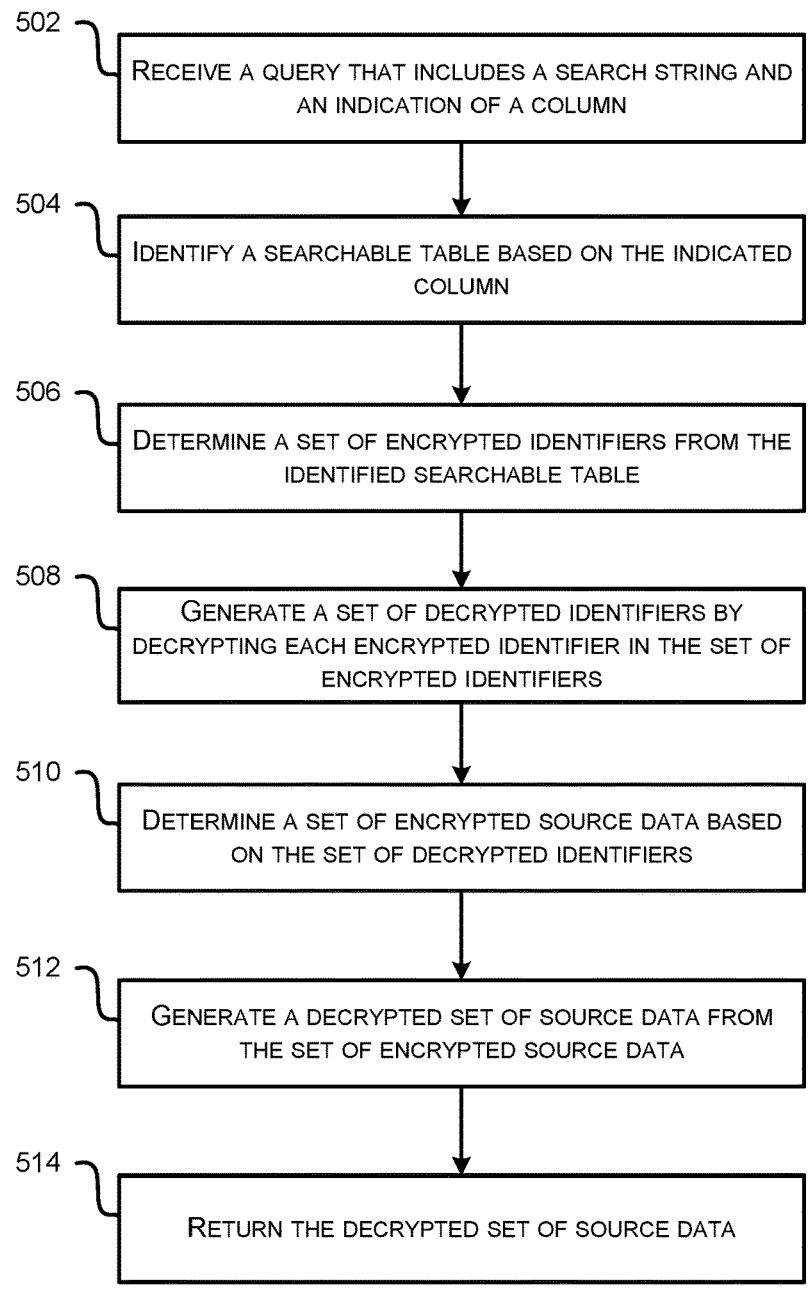
FIG. 5 depicts an example process of performing a search on a database that includes encrypted data in accordance with at least some embodiments.

FIG. 5 depicts an example process of performing a search on a database that includes encrypted data in accordance with at least some embodiments. The process 500 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

At 502, a query (request for information) is received. The query may include a search string and an indication of a column. In some embodiments, each column of a source table may be associated with a different searchable table. Each of the different searchable tables may have a decrypted version of the column, an encrypted version of the master identifier, and an index.

At 504, a searchable table associated with the search string may be identified upon determining a column to which the search string is associated. For example, if the indicated column is a "phone_number" column, then the searchable table may be a "phone_number" table, which includes a column of plaintext phone number data. In some embodiments, queries may be mapped to particular searchable tables via a graphical user interface (GUI). For example, a user may be presented with a number of searchable fields via a GUI implemented on a client device. The user may enter a search string into any of the presented searchable fields. In this example, each of the searchable fields may be associated with a searchable table. By way of illustration, the user may enter a search string into a searchable field labeled "First Name," which may be associated with a "first_name" searchable table. In this illustrative example, the "first_name" searchable table may be identified and the search string may be queried against a plaintext column within that searchable table.

At 506, the searchable table may be queried to determine a set of rows relevant to the search string based on a value from the decrypted version of column data matching the search string in each row. In some embodiments, the query may return a set of 0-N results, where N is the total number of rows in the searchable table. Each of the returned results in the set of results may include a plurality of encrypted identifiers. In some embodiments, the set of results may include a single encrypted identifier.

At 508, the process 500 may generate a set of decrypted identifiers by decrypting each of the encrypted identifiers in the set of search results. In some embodiments, each of the encrypted identifiers in the set of search results may be sent to a decryption engine separately. The decryption engine may decrypt each of the encrypted identifiers and append a decrypted identifier to a set of decrypted identifiers. In some embodiments, the entire set of search results may be provided to the decryption engine, which may subsequently produce a set of decrypted identifiers from the set of encrypted identifiers.

At 510, upon generating a set of decrypted identifiers, the source table may be queried to identify a set of encrypted data corresponding to each of the decrypted identifiers. At this step, encrypted data from one or more records associated with each decrypted identifier may be returned. For example, the source table may be queried to identify records for which the master identifier matches one of the decrypted identifiers in the set of decrypted identifiers. For each of these records, one or more pieces of encrypted source data may be retrieved from the source table. In some embodiments, the one or more pieces of encrypted source data may be specified in the received query. For example, the query may specify "select first_name and last_name," in which case the encrypted values in the first name and last name fields may be appended to a set of encrypted source data. The returned encrypted source data may be decrypted to identify one or more personal identifiable information data.

At 512, once the set of encrypted source data has been identified, the encrypted data may be decrypted. In some embodiments, the decrypted data may be filtered or otherwise narrowed down based on other criteria. For example, the decrypted data may consist of a number of rows relevant to the provided search string. In this example, a most appropriate row may be determined based on a second search string. By way of illustration, after searching the database for a set of customer records based on a phone number, the set of customer records may be narrowed down based on a name or address. A customer record may comprise a set of data associated with a particular user (e.g., the values from each column in a database row associated with the user).

At 514, the decrypted set of source data may be provided in a response to the submitted query at 514. In some embodiments, the decrypted set of source data may be provided to a user that submitted the query. In some embodiments, the decrypted set of source data may be provided to the database system so that further action may be taken with regard to the information in the decrypted set of source data. For example, the decrypted set of source data may be utilized in an update process as described with respect to FIG. 6 below.

By way of illustration, consider a scenario in which a user attempts to retrieve information related to a particular user based on a telephone number. The user may submit a query related to the individual by querying the database for the telephone number. To do this, a column of the source table that is associated with the telephone number may be identified. In some embodiments, the user may specify the column associated with a piece of personally identifiable information. In some embodiments, the personally identifiable information may be entered, via a user interface, into a field associated with a particular table column.

In the above example, the user may enter at least a portion of the individual's phone number into a phone number entry field of a graphical user interface. Upon submitting the query, the searchable table related to the phone number column may be queried for the phone number or the portion of the phone number entered. Upon identifying one or more rows of the phone number search table that match the entered phone number, a set of encrypted identifiers may be returned. The encrypted identifiers may be decrypted to determine a set of rows related to the phone number. Additional information from the identified rows may be returned to the user. For example, the user may be provided with a list of names of individuals for which the phone number is a match. In some embodiments, a particular column value or field value may be retrieved in relation to the search string. For example, a value in the name column may be provided in response to a query on a phone number search string.

IV. Updating a Database

The database scheme described includes a source table with encrypted and plaintext columns as well as a number of searchable database tables, each associated with an encrypted column of the source table. In some scenarios, one or more field values of one or more of the database tables may need to be updated. For example, data stored in the database system may need to be changed or updated as new information is received by the system. In some embodiments, updates are made to a single table (the source table) and these changes are published to the rest of the database tables.

Figure 6:
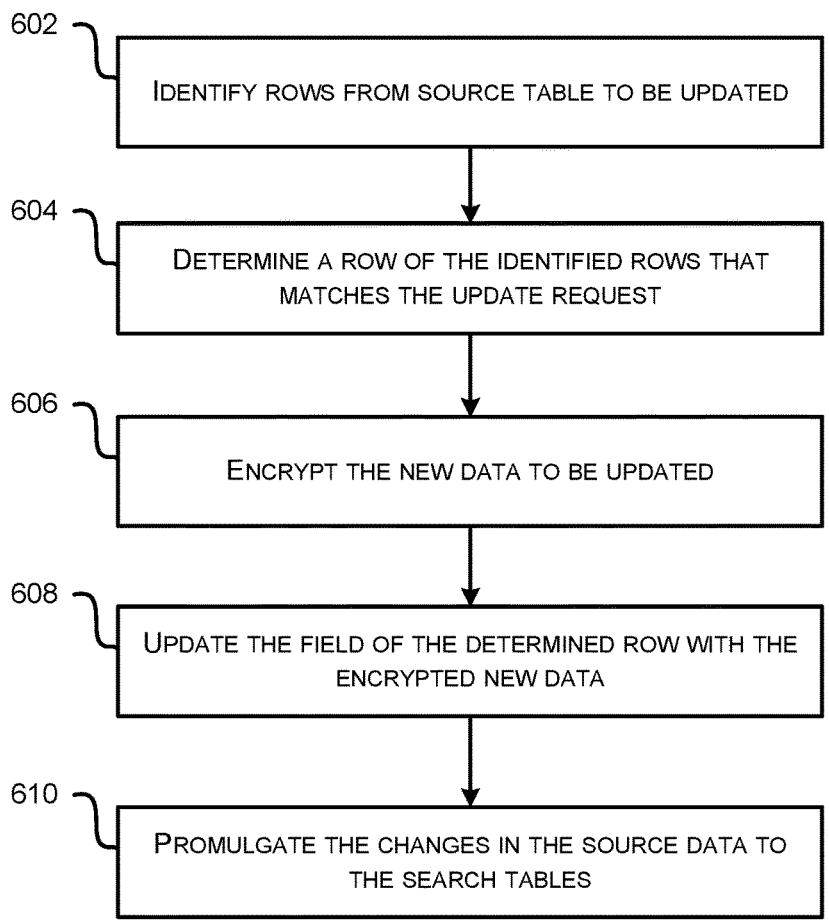
FIG. 6 depicts a process for updating a database that includes encrypted data in accordance with at least some embodiments.

FIG. 6 depicts a process 600 for updating a database that includes encrypted data in accordance with at least some embodiments. In some scenarios, it may be necessary to update or edit data stored in accordance with the disclosure.

At block 602, a user may identify one or more rows in the source table relevant to a piece of data to be updated. In accordance with at least some embodiments, process 600 may identify one or more rows to be updated via the process described with respect to FIG. 5 by first querying a searchable table to identify encrypted identifiers and afterward querying the source table for the data to be updated.

At block 604, upon identifying one or more rows to be updated, the row to be updated may be determined by comparing other information within the row to additional information related to the individual. In some embodiments, an update request may include additional information that may be used to determine which row is to be updated. For example, the update request may include a statement "wherein phone_number='123-456*' and name='John Smith'." In this example, multiple rows may be identified based on the search string '123-456*' and the multiple rows may be filtered to include only those that are also associated with a name value equal to 'John Smith.'

At block 606, once the appropriate row for which the data to be updated is identified, the new data may be encrypted using an encryption algorithm/encryption key appropriate for that row and column. In some embodiments, the new data may be provided to an encryption engine to be encrypted. The encryption engine may be an example encryption/decryption engine 210 of FIG. 2.

At block 608, the old data to be replaced in the source table may then be updated to the encrypted version of the new data. In some embodiments, changes made to the source table may be published to one or more searchable tables. For example, upon detecting a change to data within a column of the source table, the searchable table associated with that column may be updated to include the change.

At block 610, once the data is updated in the source table, the changes may be published to the searchable tables. For example, a database system may determine which columns of a source table have been updated. In this example, the searchable tables associated with those columns may be updated to include the new information. In another example, one or more searchable tables may be regenerated on a periodic basis. In this example, a new version of the searchable table may be generated to replace the old version, wherein the new version contains the updated information.

By way of illustration, consider a scenario in which a user wishes to update a phone number associated with an individual of record. In this scenario, if a user wanted to change the individual's phone number from 123-456-7890 to 987-654-3210, where the individual's name is John Smith, first the Search Phone Number table is queried for the phone number 123-456-7890 and a result set may be returned. The result set may include a set of encrypted foreign keys linked to the source table. Upon decrypting the foreign keys from the returned set of encrypted keys, the source table may be queried. In the above example, the rows associated with the phone number 123-456-7890 may be identified in the source table by querying unencrypted foreign keys returned from the searchable table. Information in the rows may then be compared to the name John Smith to identify the correct row to be updated. Once the correct row has been identified, the phone number 987-654-3210 may be encrypted. The phone number field of the identified row is then updated to be the encrypted new phone number. This new phone number may then be published to one or more searchable tables.

V. Example Computer System

Figure 7:
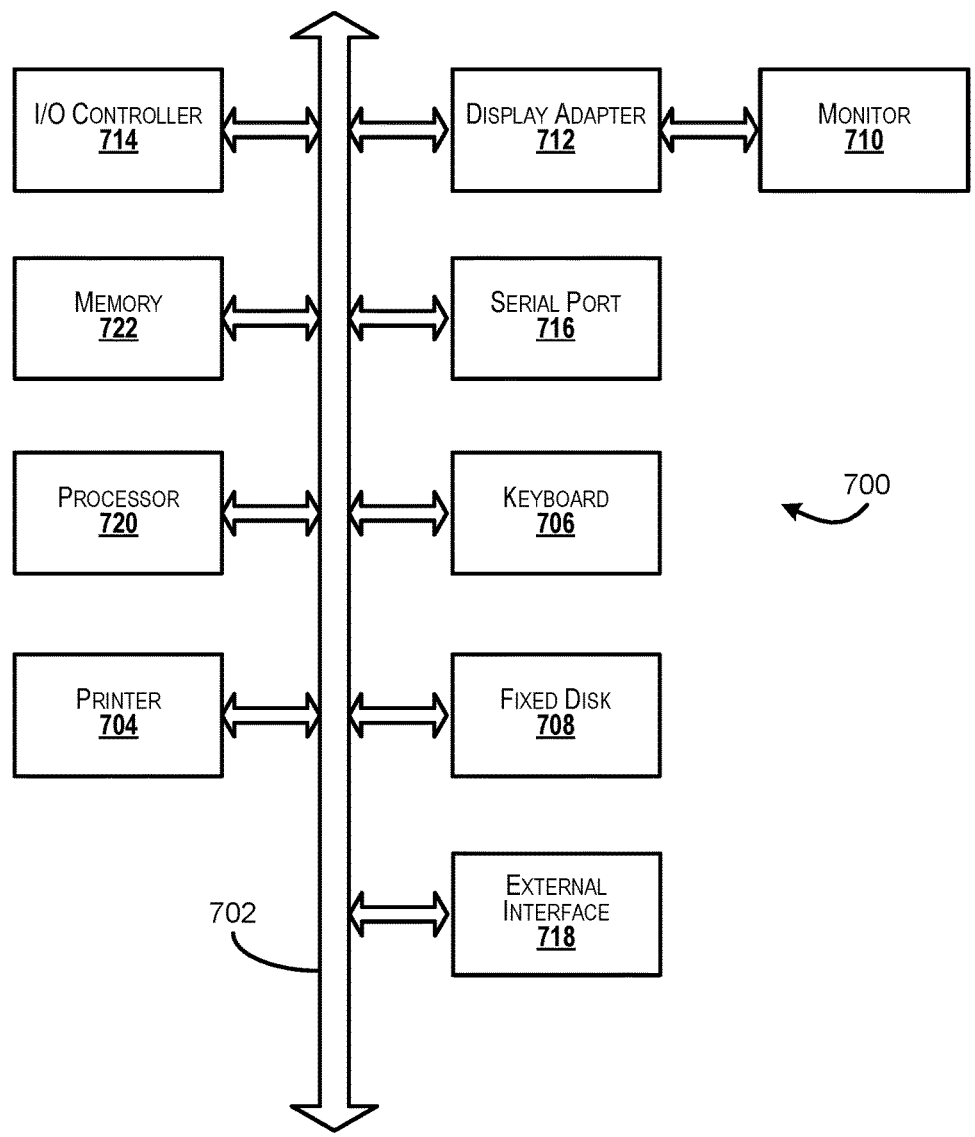
FIG. 7 depicts aspects of elements that may be present in a computer device and/or system configured to implement a method and/or process in accordance with some embodiments of the present invention.

In accordance with at least some embodiments, the system, apparatus, methods, processes and/or operations for a database platform capable of providing efficient search ability of personally identifiable information (or other encrypted data) may be wholly or partially implemented in the form of a set of instructions executed by one or more programmed computer processors such as a central processing unit (CPU) or microprocessor. Such processors may be incorporated in an apparatus, server, client or other computing device operated by, or in communication with, other components of the system. As an example, FIG. 7 depicts aspects of elements that may be present in a computer device and/or system 700 configured to implement a method and/or process in accordance with some embodiments of the present invention. The subsystems shown in FIG. 7 are interconnected via a system bus 702. Additional subsystems include a printer 704, a keyboard 706, a fixed disk 708, and a monitor 710, which is coupled to a display adapter 712. Peripherals and input/output (I/O) devices, which couple to an I/O controller 714, can be connected to the computer system by any number of means known in the art, such as a serial port 716. For example, the serial port 716 or an external interface 718 can be utilized to connect the computer device 700 to further devices and/or systems not shown in FIG. 7 including a wide area network such as the Internet, a mouse input device, and/or a scanner. The interconnection via the system bus 702 allows one or more processors 720 to communicate with each subsystem and to control the execution of instructions that may be stored in a system memory 722 and/or the fixed disk 708, as well as the exchange of information between subsystems. The system memory 722 and/or the fixed disk 708 may embody a tangible computer-readable medium.

A computer system can include a plurality of the same components or subsystems, e.g., connected together by an external interface or by an internal interface. In some embodiments, computer systems, subsystems, or apparatuses can communicate over a network. In such instances, one computer can be considered a client and another computer a server, where each can be part of a same computer system. A client and a server can each include multiple systems, subsystems, or components.

Embodiments of the invention provide for a number of technical advantages. For example, embodiments of the invention enable a user to efficiently query a database that includes encrypted data using wildcards or a portion of a text string. Additionally, the invention enables segregation of personally identifiable information into separate un-linkable tables so that even if a portion of data is acquired by a fraudster, the obtained information would be useless to the fraudster as he or she would be unable to acquire additional information.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer-readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer-readable medium may be any combination of such storage or transmission devices.

Such programs may also be encoded and transmitted using carrier signals adapted for transmission via wired, optical, and/or wireless networks conforming to a variety of protocols, including the Internet. As such, a computer-readable medium according to at least some embodiments of the present invention may be created using a data signal encoded with such programs. Computer-readable media encoded with the program code may be packaged with a compatible device or provided separately from other devices (e.g., via Internet download). Any such computer-readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method for searching a database to obtain data, comprising:
   receiving, by a computer database system, a request for data comprising a search string;
   determining a search column of a first table indicated in relation to the search string, the first table storing plaintext data of a particular type of personally identifiable information (PII) within the search column;
   searching the search column of the first table of the computer database system using the search string to identify a matching string, wherein the first table includes an encrypted foreign key for each field, and the matching string is identified from the plaintext data;
   obtaining at least one encrypted foreign key corresponding to the matching string identified using the search string;
   sending the at least one encrypted foreign key to a decryption engine executing on one or more processors of the computer database system;
   receiving from the decryption engine, at least one decrypted foreign key corresponding to the at least one encrypted foreign key, wherein the decrypted foreign key is generated by the decryption engine using a decryption key unique to the first table;
   searching a second table of the computer database system using the at least one decrypted foreign key to obtain encrypted data, wherein the encrypted data comprises a different second type of PII;
   sending the encrypted data to the decryption engine to decrypt the encrypted data; and
   receiving, from the decryption engine, decrypted data resulting from decryption of the encrypted data, wherein the decrypted data comprises the requested data.

2. The method of claim 1, wherein the decryption engine is a hardware security module (HSM).

3. The method of claim 1, wherein the search string is received via a request for the decrypted data and includes a wildcard.

4. The method of claim 1, further comprising:
   searching the second table of the computer database system using the foreign key to obtain plaintext data;
   appending the obtained plaintext data to the decrypted data; and
   returning the appended decrypted data to a requestor device from which the search string was received.

5. The method of claim 1, further comprising:
   receiving a request to update the decrypted data with new data;
   sending the new data to an encryption engine;
   receiving, from the encryption engine, an encrypted new data; and
   replacing the encrypted data with the encrypted new data.

6. The method of claim 1, further comprising:
   searching at least one third table of the computer database system using at least one second search string to identify at least one second matching string, wherein the at least one third table includes a second encrypted foreign key for each field;
   obtaining at least one second encrypted foreign key corresponding to the matching string identified using the second search string;
   sending the at least one second encrypted foreign key to the decryption engine; and
   receiving, from the decryption engine, at least one second decrypted foreign key corresponding to the at least one second encrypted foreign key, wherein searching a second table of the computer database system comprises identifying encrypted data for which the at least one decrypted foreign key matches the at least one second decrypted foreign key.

7. The method of claim 1, wherein the first table of the computer database system comprises a first column of encrypted foreign keys and a second column of plaintext data, wherein searching the first table of the computer database system using the search string to identify the matching string comprises searching the column of plaintext data for one or more values that match the search string, and wherein the at least one encrypted foreign key includes an encrypted foreign key for each of the one or more values that match the search string.

8. A system comprising:
one or more processors and a memory including instructions that, when executed by the one or more processors, cause the one or more processors to:
receive a request for data comprising a search string;
determine a search column of a first table indicated in relation to the search string, the first table storing plaintext data of a particular type of personally identifiable information (PII) within the search column;
search the search column of the first table of the computer database system using the search string to identify a matching string, wherein the first table includes an encrypted foreign key for each field, and the matching string is identified from the plaintext data;
obtain at least one encrypted foreign key corresponding to the matching string identified using the search string;
send the at least one encrypted foreign key to a decryption engine executing on one or more processors of the computer database system;
receive from the decryption engine, at least one decrypted foreign key corresponding to the at least one encrypted foreign key, wherein the decrypted foreign key is generated by the decryption engine using a decryption key unique to the first table;
search a second table of the computer database system using the at least one decrypted foreign key to obtain encrypted data, wherein the encrypted data comprises a different second type of PII;
send the encrypted data to the decryption engine to decrypt the encrypted data; and
receive, from the decryption engine, decrypted data resulting from decryption of the encrypted data, wherein the decrypted data comprises the requested data.

9. The system of claim 8, wherein the at least one encrypted foreign key is decrypted using a decryption key associated with the first table.

10. The system of claim 8, wherein the query is included in an update request that includes new data, and wherein the instructions further cause the one or more processors to:
update the decrypted set of source data to include the new data;
encrypt the updated set of source data; and
replace the set of encrypted source data with the encrypted updated set of source data in the second table.

11. The system of claim 10, wherein the instructions further cause the one or more processors to update the first table to reflect the encrypted updated set of source data.

12. A non-transitory computer readable medium storing specific computer-executable instructions that, when executed by a processor, cause a computer system to at least:
receive a request for data comprising a search string;
determine a search column of a first table indicated in relation to the search string, the first table storing plaintext data of a particular type of personally identifiable information (PII) within the search column;
search the search column of the first table of the computer database system using the search string to identify a matching string, wherein the first table includes an encrypted foreign key for each field, and the matching string is identified from the plaintext data;
obtain at least one encrypted foreign key corresponding to the matching string identified using the search string;
send the at least one encrypted foreign key to a decryption engine executing on one or more processors of the computer database system;
receive from the decryption engine, at least one decrypted foreign key corresponding to the at least one encrypted foreign key, wherein the decrypted foreign key is generated by the decryption engine using a decryption key unique to the first table;
search a second table of the computer database system using the at least one decrypted foreign key to obtain encrypted data, wherein the encrypted data comprises a different second type of PII;
send the encrypted data to the decryption engine to decrypt the encrypted data; and
receive, from the decryption engine, decrypted data resulting from decryption of the encrypted data, wherein the decrypted data comprises the requested data.

13. The computer readable medium of claim 12, wherein the encrypted data is decrypted to determine information related to the search string.

14. The computer readable medium of claim 12, wherein the second table comprises a column of plaintext identifiers and multiple columns of encrypted data.

15. The computer readable medium of claim 12, wherein the first table comprises a column of encrypted foreign keys corresponding to the search column including plaintext.

16. The computer readable medium of claim 15, wherein at least one row relevant to the search string is identified as a row containing the matching string in the search column, and wherein the encrypted foreign key corresponding to the matching string is identified by virtue of being in the at least one row.

* * * * *

UNITED STATES PATENT AND TRADEMARK OFFICE
CERTIFICATE OF CORRECTION

PATENT NO. : 10,114,955 B2
APPLICATION NO. : 15/041783
DATED : October 30, 2018
INVENTOR(S) : Adam Conway It is certified that error appears in the above-identified patent and that said Letters Patent is hereby corrected as shown below:

In the Claims

In Column 18, Claim 6, Line 50, please add the word "second" between "the" and "matching"

Signed and Sealed this
Eleventh Day of December, 2018

Andrei Iancu
*Director of the United States Patent and Trademark Office*